(12) United States Patent
Mark

(10) Patent No.: US 6,735,099 B2
(45) Date of Patent: May 11, 2004

(54) POWER SUPPLY UNIT FOR BIPOLAR POWER SUPPLY

(75) Inventor: Günter Mark, Buehl (DE)

(73) Assignee: Melec GmbH, Ottersweier (DE)

( * ) Notice: Subject to any disclaimer, the term of this patent is extended or adjusted under 35 U.S.C. 154(b) by 0 days.

(21) Appl. No.: 10/257,189

(22) PCT Filed: Apr. 17, 2001

(86) PCT No.: PCT/DE01/01508
§ 371 (c)(1),
(2), (4) Date: Oct. 8, 2002

(87) PCT Pub. No.: WO01/80413
PCT Pub. Date: Oct. 25, 2001

(65) Prior Publication Data
US 2003/0174526 A1 Sep. 18, 2003

(30) Foreign Application Priority Data
Apr. 17, 2000 (DE) .......................................... 100 18 879

(51) Int. Cl.⁷ ............................................... H02M 7/42
(52) U.S. Cl. ............................ 363/63; 363/132; 307/29
(58) Field of Search ............................. 363/17, 63, 65, 363/98, 131, 132; 307/29, 69, 80; 204/298.08

(56) References Cited
U.S. PATENT DOCUMENTS 5,303,139 A * 4/1994 Mark ........................... 363/63
5,910,886 A * 6/1999 Coleman ..................... 363/17

FOREIGN PATENT DOCUMENTS

DE 31 48 004 6/1983
EP 0 534 068 3/1993

* cited by examiner

Primary Examiner—Jessica Han
(74) Attorney, Agent, or Firm—Smith-Hill and Bedell

(57) ABSTRACT

The invention relates to a power supply unit for bipolar power supply of a plasma technology or surface technology system having at least one controllable d.c. power supply (G1, G2), whose positive and negative outputs are connected to the input of at least one bridge circuit of electronic power switches (T1 to T4), said power switches being connected on the input side to at least one control signal conditioning device and on the output side to at least one current detection circuit for the open-/closed-loop control of the power switches, and being connected to the load of the system (A). By means of this invention, current pulses having freely variable amplitudes ($V_{o+}$, $V_{o-}$) can be generated for the positive and negative current pulses by providing for each bridge circuit (T1 to T4) at least two d.c. power supplies (G1, G2), and the positive output of the two d.c. power supplies is connected in series in each case by two power switches (T1 and T4; T2 and T3) to the negative output of the other power supply (G2, G1), where the output of the bridge circuit for the system in each case has a tap between the power switches of the two series circuits.

11 Claims, 3 Drawing Sheets

POWER SUPPLY UNIT FOR BIPOLAR POWER SUPPLY

Figure 1:
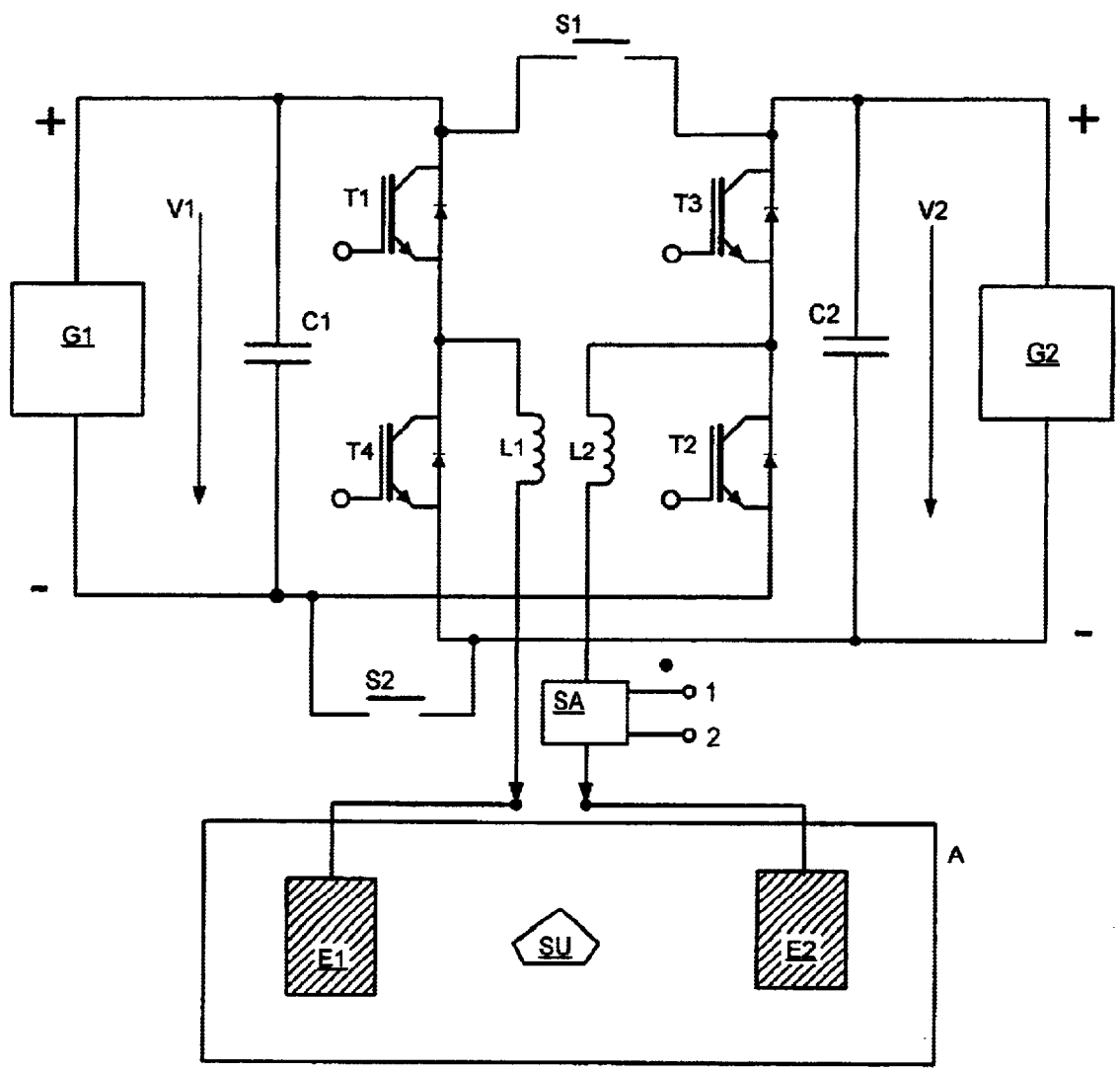

The present invention relates to a power supply unit for the bipolar supply of power to a plasma technology system or a surface technology system as set forth in the preamble of claim 1. Such units, as are disclosed for example in EP 534 068 B, generally comprise a d.c. main power supply whose outputs are connected to the inputs of a bridge circuit of electronic power switches. The power switches are connected to control signal conditioning devices that control the power switches in the desired manner in order to obtain a desired pulse pattern for the plasma system. The unit has separate control signal conditioning devices to individually regulate the control times for the positive and negative output signals, allowing any impulse shape to be selected.

The object to the invention is to improve upon a prior-art power supply unit in such a way as to increase the degree of freedom in selecting a desired pulse shape. In the invention, this object is accomplished with a power supply unit of the type set forth in the preamble through the characteristic elements of claim 1. A further object of the invention is to create an apparatus that permits any desired pulse shapes to be supplied at frequencies into megahertz range. This object is accomplished by an apparatus as recited in claim 7.

The dependent claims set forth advantageous embodiments of the invention.

In the invention at least two d.c. power supplies must be used for each bridge circuit. The bridge is divided, insofar as a series circuit comprising two power semiconductors is interposed between the positive output of the first d.c. power supply and the negative output of the second d.c. power supply.

The same applies to the negative output of the first d.c. power supply and to the positive output of the second d.c. power supply, between which a series circuit comprising two power semiconductors is connected. The tap for the pulses sent to the plasma system always is located between the two power switches in the series circuits.

In this way, the amplitudes of the positive and negative pulses can be freely selected—for example, corresponding to a desired signal pattern.

If, in addition, separate control signal conditioning devices are provided to individually control the various power switches, it is not only possible to select any desired amplitudes of the positive and negative pulses, it is also possible to select their switching time and signal pauses or dead times. Thus, the greatest possible degree of freedom for selecting a pulse pattern to be sent to a plasma system is provided.

Since these systems have to be able to switch a very high current, the effective range of the power supply units is limited to a frequency range of about 100 to 200 kHz. By using a plurality of power supply units connected in parallel, preferably two to eight, and synchronously controlling the individual power supply units with correspondingly short timing offsets, it is possible to achieve any desired pulse pattern with a frequency extending into the megahertz range if, for example, eight units having a frequency of 125 kHz are used. The devices are preferably controlled by means of a control bus at the control input of the individual units. In this case, the control signals from a central control unit are sent to the single individually addressable units.

To accomplish this, the individual power supply units are preferably provided with an address or ID code that allows the systematic response of each individual current power supply unit to be controlled.

The outputs of the d.c. power supplies are preferably stabilized by capacitative means using capacitors that have the highest possible capacitance in order to be able to provide very high pulse currents. If the power supply units are being operated near the limit of their maximum capacitance, the dead time between the pulses can be limited without constraints.

A bridge can preferably be connected between the negative outputs as well as between the positive outputs of each of the two d.c. power supply units, so that it is possible to switch to conventional operation, however such conventional operation does not permit the positive and negative pulse amplitudes to be individually controlled.

The maximum permissible current dynamics for the switchable transistors and free-wheeling diodes is adjusted by means of two output-side inductances L1 and L2. In this way the pulse current is read and evaluated dynamically. In particular, with very low-impedance short circuits, it is necessary to quickly determine the amount of excess current and to shut off the transistors as soon as possible, in order to prevent damage to the semiconductor layer, to the substrate surfaces, or to the plasma coating system.

The power supply unit of the invention or the apparatus comprised of power supply units, can be used for all plasma-technology processes such as CVD, plasma PVD, magnetron sputtering, plasma nitriding, and plasma etching.

Figure 2:
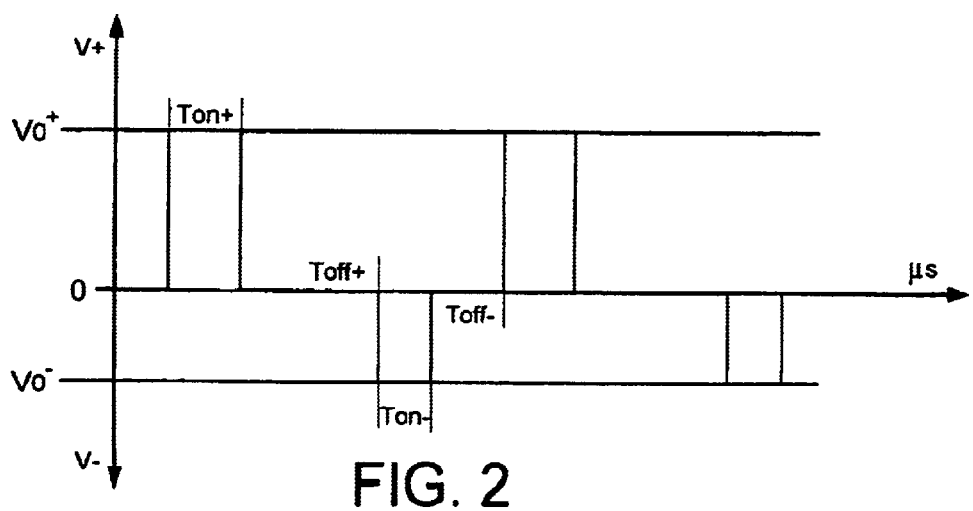
Figure 3:
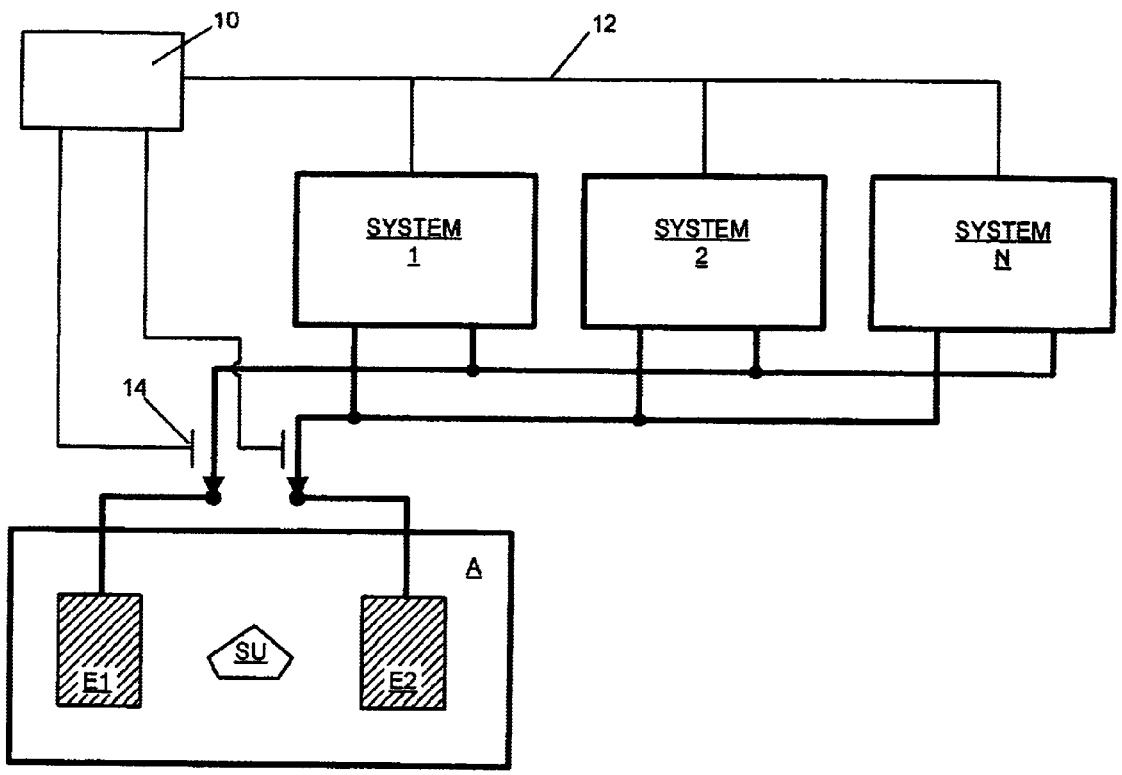
Figure 5:
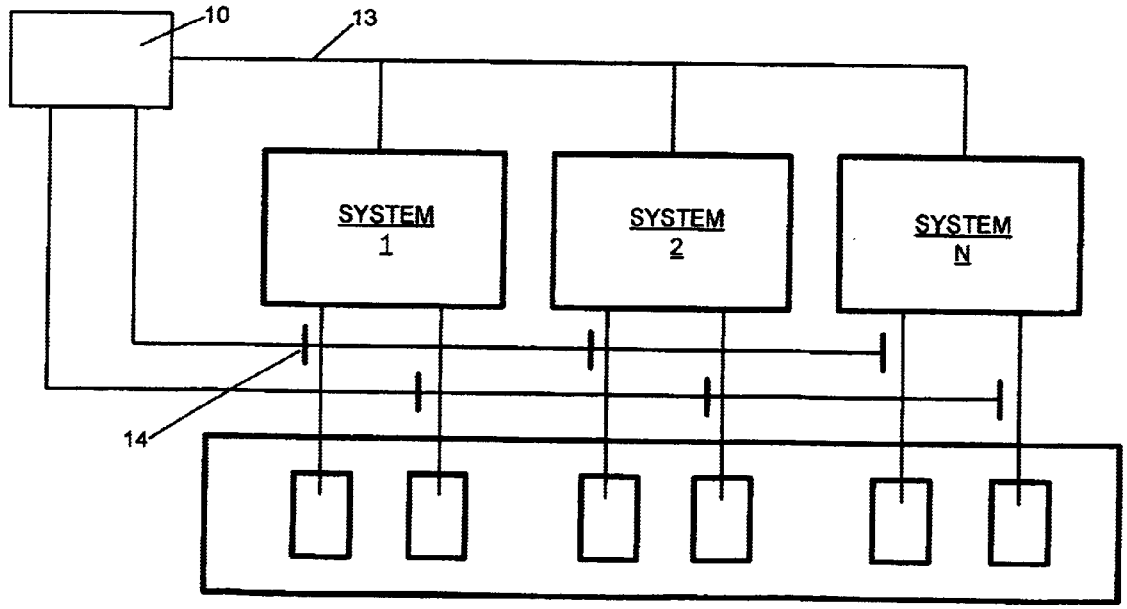

The invention is described below based on the schematic diagram. The schematic diagram shows:

FIG. 1 a greatly simplified wiring diagram of a power supply unit of the invention, without control circuitry, FIG. 2 an illustration of the output pulses of the bipolar power supply of the invention, FIG. 3 a schematic diagram of an apparatus of the invention having a plurality power supplies, FIGS. 4A–F possible pulse patterns created by the apparatus shown in FIG. 3, and FIG. 5 an apparatus comprising a plurality of power supplies that provides an alternative to FIG. 3.

FIG. 1 shows a power supply unit having two d.c. power supplies G1, G2, whose outputs are stabilized by capacitors C1, C2. Voltage V1 is applied to d.c. power supply G1, while voltage V2 is applied to d.c. power supply G2. The positive output of the first d.c. power supply G1 is connected to the negative output of the d.c. power supply G2 by means of two power switches T1, T4 connected in series. In a similar manner, the negative output of the first d.c. power supply G1 is connected to the positive output of the second d.c. power supply G2, by means of two power switches T2, T3 connected in series. The outputs going to a plasma system A are attached in the middle between the series circuits T1, T4, T2, T3 and are limited with regard to current dynamics by inductances L1, L2, in order to protect the power switches as well as the plasma system itself and the substrates SU contained in it. A current consumer is connected to the output of the power supply unit. Its output signal is sent to a controller (not shown) used to control the power switches T1 to T4 in order to achieve closed-loop control-in other words, a feedback-controlled control system.

The placement of two bridges S1, S2 between the positive outputs and between the negative outputs of the two d.c. power supplies G1, G2 allows the power supply unit to be operated in a conventional manner, albeit with identical amplitudes for the negative and positive current pulses. For example, the following operating modes may be set:

D.c. voltage DC+when T1 and T2 are closed, while T3 and T4 are open.

D.c. voltage DC−when T3 and T4 are closed while T2 and T2 [sic] are open.

Unipolar plus pulsed UP+when T1 and T2 are pulsed, while T3 and T4 are open.

Unipolar negative pulsed UP−when T3 and T4 are pulsed while T1 and T2 are open.

Bipolar pulsed BP, when T1 and T2 alternatively are clocked with T3 and T4.

FIG. 2 describes the pattern over time of a possible pulse pattern with the power supply unit of the invention of FIG. 1. Time is plotted on the horizontal axis in microseconds. The vertical axis shows the voltage of the output pulses in the positive and negative directions. The figure shows an initial positive pulse having an output voltage of $V_{0+}$ and a pulse duration of $T_{on+}$, followed by an off-time $T_{off+}$. An initial negative pulse having an amplitude of $V_{0-}$ and a pulse duration of $T_{on-}$ follows this off-time, followed by the off-time $T_{off-}$. The four pulse time parameters $T_{on+}$, $T_{off+}$, $T_{on-}$, and $T_{off-}$ during a period can be freely selected independently of each other, whereby currently, when conventional technology is being used, the total of the times in a period must not exceed 8 microseconds (corresponding to a frequency of max. 125 kHz).

FIG. 3 shows an apparatus for generating high-energy, high-frequency pulse trains having frequencies extending into the megahertz range. The apparatus comprises a plurality of power supply units as shown in FIG. 1, which are identified in this figure by the references "System 1, System 2, . . . System N." The outputs of said plurality of power supply units, preferably 2 or 3 or up to 20 power supply units, are connected in parallel and are routed to the input of a plasma system A. In order to synchronize and control the individual power generation units, a central controller 10 is provided. It is connected via a data bus to the control connections of the individual power supply units. Since in this system each power supply unit, System 1 to System N, has its own identification or address, the central controller 10 can individually control each power supply unit in the apparatus. Instead of using addressability, the controller of course may also be individually connected to each power supply unit by means of separate supply lines.

Figure 4A:
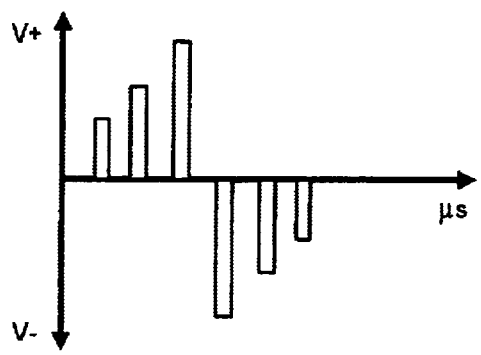
Figure 4B:
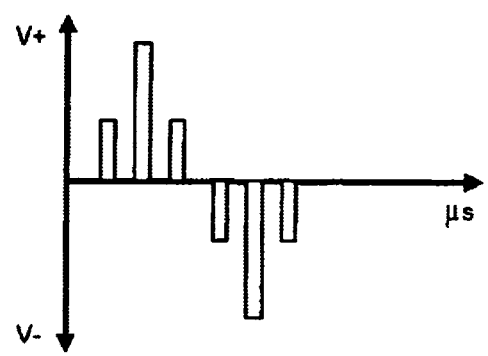
Figure 4C:
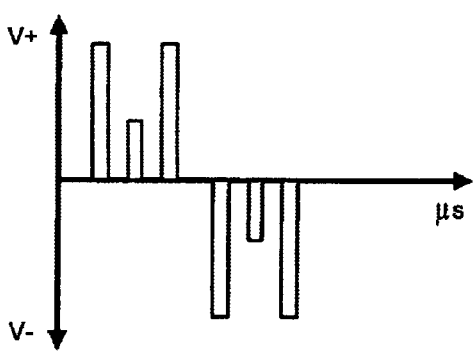
Figure 4D:
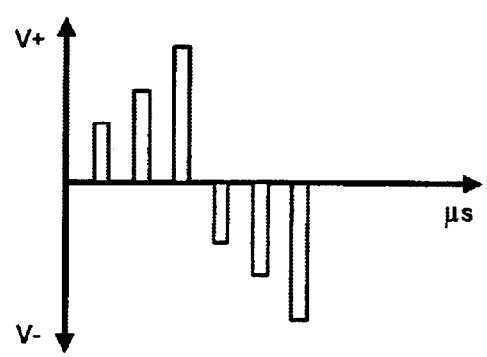
Figure 4E:
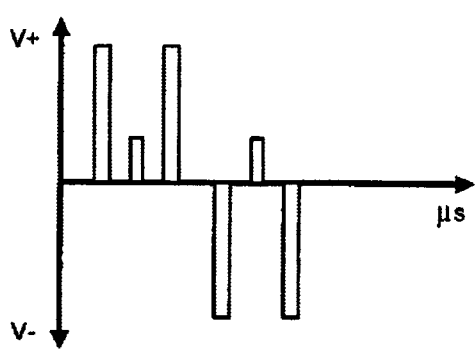
Figure 4F:
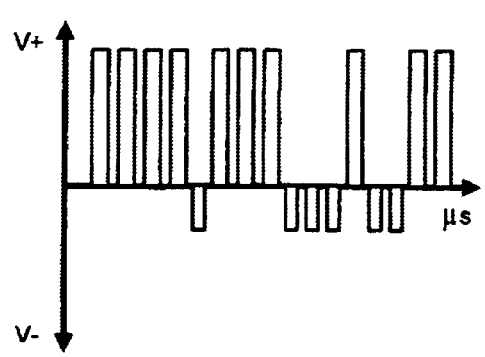

In addition, power consumers 14 are provided in the parallel output ahead of the feed into system A. Their outputs are connected to the central controller 10 in order in this manner to obtain feedback to control the controller. The signal shapes shown in FIGS. 4A to F can be generated by means of this apparatus, which is shown in FIG. 3. The polarity of the train of individual pulses as well as amplitude and duration of these pulses, as well as the dead times between the pulses, can be set separately and individually. In this way, high-energy, high-frequency pulse patterns having frequencies extending up into the megahertz range can be generated. As shown, for example, in FIG. 4B, sine curves can be approximated. As shown in FIG. 4A triangular curves can be approximated. FIG. 4D shows an approximated sawtooth curve in a bipolar train.

Of course, the pulses from the various generation units System 1 . . . System N can also be sent, overlapping one another in time, so that brief high-power pulses can be produced, albeit at a lower frequency.

The apparatus can also be used to generate desired pulse shapes by means of a kind of Fourier transformation, a technique which may be used to transform a plasma in a coating system into a desired excitation form. In the freely configurable setting of the pulse pattern with an N-tuple pulse-parallel connection of N power supply units, certain frequency spectra can be superimposed additively or removed by adding or removing individual pulse components.

FIG. 5 shows a system that is largely identical with FIG. 3, and in it identical or functionally equivalent parts have the same reference identifiers. However, in FIG. 5, unlike in FIG. 3, the electrodes of the individual power supply units SYSTEM 1 . . . SYSTEM N are not connected in parallel, but are arranged according to a specified layout, for example circular, in the treatment chamber of the plasma system. This not only allows the pulse shape of the incoming current pulses to be set, it also allows the geometric development of the plasma to be influenced.

Instead of individual power supplies G1, G2, power supplies can also be connected in parallel or in series. The use of the connection circuit described above is not limited to the power supplies specified above. It can also be implemented with all types of high-power power supplies, in order to obtain high-frequency high-power power supplies with any desired pulse trains.

What is claimed is:

1. A power supply unit for bipolar power supply of a plasma technology or surface technology system having at least one controllable d.c. power supply (G1, G2), whose positive and negative outputs are connected to the input of at least one bridge circuit of electronic power switches (T1 to T4), said power switches being connected on the input side to at least one control signal conditioning device and on the output side to at least one current detection circuit for the open-/closed-loop control of the power switches, and being connected to the load of the system (A), wherein
   for each bridge circuit (T1 to T4) at least two d.c. power supplies (G1, G2) are provided, the positive output of the two d.c. power supplies is connected in series in each case by two power switches (T1 and T4; T2 and T3) to the negative output of the other power supply (G2, G1), whereby the output of the bridge circuit for the system in each case has a tap between the power switches of the two series circuits.

2. The unit of claim 1, wherein separate control signal conditioning devices (12, 13) are provided to individually control the positive and negative output signals, which are combined in separate closed-loop control circuits, that are controlled independently of one another by a controller (18).

3. The unit of claim 1, wherein the electronic power switches are produced by MOSFETs.

4. The unit of claim 1, wherein the power switches are bipolar transistors IBGTs or other fast-switching electronic power semiconductors.

5. The unit of claim 1, wherein the output from the two DC power supplies is stabilized capacitatively.

6. The unit of claim 1, wherein at least one switch is provided for switching the DC power supplies in parallel.

7. The unit of claim 1, wherein a controller for the separate open- and closed-loop control of the DC power supplies is provided.

8. An apparatus having a plurality of units of claim 1, characterized by a central controller for simultaneously controlling and/or synchronizing the output pulses issued by the individual units in which the outputs of all units to the system are connected in parallel.

9. The apparatus of claim 8, wherein the central controller is connected to control inputs provided on the units by means of a bus system, and preferably is also connected to a current detection circuit.

10. The process for generating high-frequency current pulses for plasma technology and surface technology systems with an apparatus having a plurality of units of claim 1, in particular between 3 and 20, and in which the outputs of all units to the system are connected in parallel, characterized by a central controller for simultaneously controlling and/or synchronizing the output pulses issued by the individual units, where the units are controlled by the central controller that is used to generate a coherent signal train, in which each unit is caused to generate a signal pulse, whose pulse time is, at most, equal to the total time of the signal pattern divided by the number of units.

11. A process for generating current pulses for plasma technology and surface technology systems using a power supply unit for bipolar power supply of a plasma technology or surface technology system having at least one controllable DC power supply, whose positive and negative outputs are connected to the input of at least one bridge circuit of electronic power switches, said power switches being connected on the input side to at least one control signal conditioning device and on the output side to at least one current detection circuit for the open-/closed-loop control of the power switches, and being connected to the load of the system, wherein for each bridge circuit at least two DC power supplies are provided, the positive output of the two DC power supplies is connected in series in each case by two power switches to the negative output of the other power supply, whereby the output of the bridge circuit for the system in each case has a tap between the power switches of the two series circuits, whereby the current pulses having freely configurable system times are generated for the positive as well as the negative current pulses and separately selectable amplitudes are generated for the positive and negative current trains.

* * * * *